United States Patent [19]

Pearson, Jr. et al.

[11] 3,794,998
[45] Feb. 26, 1974

[54] MONOPULSE RADAR RECEIVER WITH ERROR CORRECTION

[75] Inventors: Earl C. Pearson, Jr., Watertown; Gerrit B. Postema, Wayland; Willard W. McLeod, Jr., Lexington; Frederick A. Fenzel, Natick, all of Mass.

[73] Assignee: Raytheon Company, Lexington, Mass.

[22] Filed: Apr. 26, 1972

[21] Appl. No.: 247,674

[52] U.S. Cl............ 343/16 M, 343/5 DP, 343/17.7
[51] Int. Cl.............................................. G01s 9/22
[58] Field of Search............. 343/16 M, 5 DP, 17.7

[56] References Cited
UNITED STATES PATENTS

| 3,727,227 | 4/1973 | Takao et al. | 343/16 M |
| 3,718,927 | 2/1973 | Howard et al. | 343/16 M |
| 3,243,815 | 3/1966 | Dynan et al. | 343/16 M |
| 2,881,423 | 4/1959 | Jacobson et al. | 343/16 M |
| 3,617,719 | 11/1971 | Wong | 343/5 DP |
| 3,701,152 | 10/1972 | Howard | 343/16 M |
| 3,599,208 | 8/1971 | Nelson | 343/16 M |

*Primary Examiner*—Benjamin A. Borchelt
*Assistant Examiner*—H. A. Birmiel
*Attorney, Agent, or Firm*—Richard M. Sharkansky; Philip J. McFarland; Joseph D. Pannone

[57] ABSTRACT

A monopulse radar receiver is disclosed wherein angle error digital computation apparatus is used for correcting received target return signals in accordance with digital correction signals which are derived within such receiver in response to pilot pulses. Such digital computation apparatus includes means for generating, from pilot pulses, digital signals representative of the pair of quadrature components of video signals developed in the sum channel and each one of the difference channels. The quadrature components associated with the target return signals are then corrected in accordance with the quadrature components associated with the digital correction signals.

3 Claims, 2 Drawing Figures

MONOPULSE RADAR RECEIVER WITH ERROR CORRECTION

The invention herein described was made in the course of or under a contract or subcontract thereunder, with the Department of Defense.

BACKGROUND OF THE INVENTION

This invention relates generally to monopulse radar receivers and more particularly to angle error digital computation apparatus used therein for correcting received radar return signals in accordance with correction signals generated within such a receiver.

As is known in the art, in a monopulse receiver the relative phase and gain differences between the sum channel and each one of the pair of difference channels may, as described in detail in "Radar Handbook" by M. I. Skolnik, puglished by McGraw-Hill Book Company, New York, N.Y. 1970, pgs. 21–21 to 21–25, have significant effect on the performance of such receiver. The relative phase and gain differences are, primarily, the result of such receiver using different R.F. and I.F. circuitry for the sum channel and each one of the pair of difference channels.

One technique sometimes used to compensate for such differences is to apply a R.F. pilot pulse to the receiver, measure the video signals in the sum and difference channels of the receiver by such pilot pulse, and adjust the phase shift and gain of the receiver in accordance with such measurements. Generally adjustment is made by using analog devices, such as diode controlled I.F. phase shifters and attenuators. Such devices are generally used in each one of the difference channels of the receiver, being arranged to vary the phase shift and gain of such channels in a manner determined by the video signals from the pilot pulse.

As is well known, analog devices of the type generally used in the manner just described are subject to, inter alia, drift. It has been suggested that digital apparatus be substituted for the analog devices described above. Such digital apparatus would include means for digitizing the video signals produced in response to the pilot pulse, means for digitally calculating the phase and gain differences between the various channels, and means for correcting the monopulse signals from targets by algebraically adding the proper phase and gain to the target return signals produced in response to each transmitted pulse. Such contemplated digital technique requires a relatively large amount of digital apparatus, thereby making such apparatus relatively expensive.

SUMMARY OF THE INVENTION

With this background of the invention in mind it is an object of the invention to provide an improved monopulse receiver angle error digital computation apparatus for digitally correcting received target return signals in accordance with test signals generated within such receiver.

It is a further object of the invention to provide a monopulse receiver digital computation apparatus of the above type which is simpler and less expensive than has been known heretofore.

These and other objects of the invention are attained generally by providing means for generating digital signals representative of a pair of quadrature components of video signals developed in, respectively, the sum channel and each one of the difference channels of a monopulse receiver, such components being produced in response to a pilot pulse, and then using such components to correct the digital signals representative of the quadrature components of the signals associated with each target return signal.

BRIEF DESCRIPTION OF THE DRAWINGS

The foregoing features and many of the attendant advantages thereof may be more fully understood from the following detailed description read together with the accompanying drawings, wherein.

DESCRIPTION OF THE PREFERRED EMBODIMENTS

Figure 1:
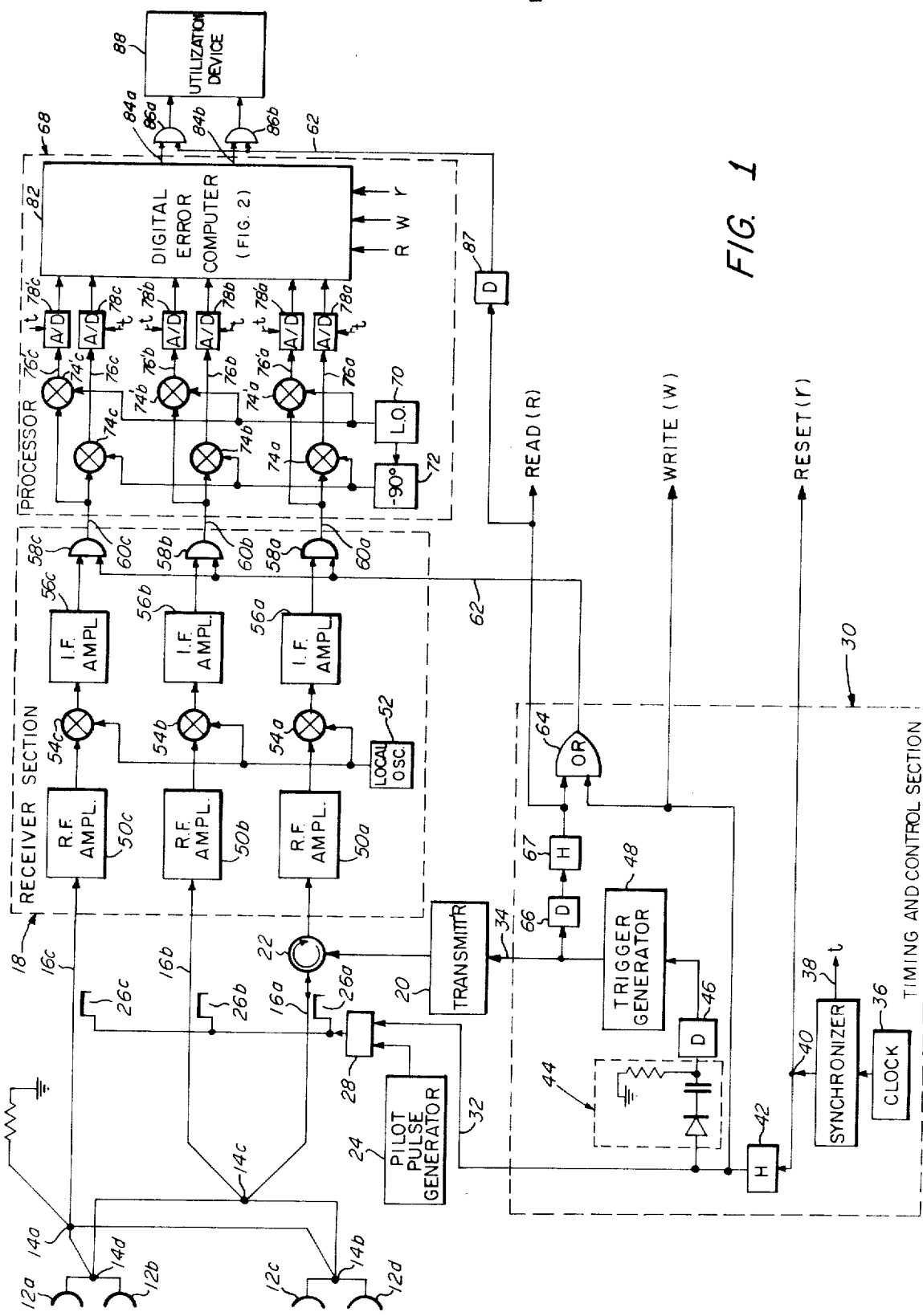
FIG. 1 is a block diagram of a monopulse radar system according to the invention.

Referring now to FIG. 1, a radar system having a monopulse receiver for amplitude comparison is shown. Such system includes a microwave section or front end, (not numbered), comprised of four antenna elements $12a - 12d$, and four hybrid junctions $14a - 14d$, connected in a conventional manner to form a sum channel $16a$, an elevation channel $16b$ (i.e. a difference channel) and an azimuth channel (i.e. a difference channel) $16c$ for receiver section 18. It is noted that sum channel $16a$ is coupled, selectively, to receiver section 18 and transmitter 20, in a conventional manner, here by circulator 22. Each one of the channels $16a - 16c$ is also coupled to a pilot pulse generator 24 via a separate directional coupler $26a - 26c$, respectively, and an RF switch 28, as shown. Here pilot pulse generator 24 is a microwave oscillator having a frequency substantially equal to the frequency of transmitter 20. Timing and control section 30 supplies a gating signal on line 32 to enable R.F. signals (i.e. pilot pulses) from pilot pulse generator 24 to pass through R.F. switch 28 to receiver section 18. Each pilot pulse is of a time duration sufficient to permit digital calculations of its quadrature components to be made in a manner to be discussed. A short time after each pilot pulse a transmit initiate signal is applied to line 34 by timing and control section 30. Such transmit initiate signal enables transmitter 20 to transmit a pulse of R.F. energy via a circulator 22 and antenna elements 12a and 12d and thereby illuminate a target.

The gating signal (on line 32) and transmit initiate signal (on line 34) are produced by timing and control section 30 in the following manner. Clock 36 sends a series of pulses, in a conventional manner, to synchronizer 38. Synchronizer 38 is of conventional design and sends synchronizing pulses, $t$, to various elements of the radar system which will be described later, and also sends pulses on line 40. The pulses on line 40 pass through a hold network 42 (which may, for example, be a conventional monostable multivibrator). Hold network 42 produces the required gating signal on line 32. The trailing edge of the gating signal (on line 32) is sensed by means of network 44 to actuate a delay network 46 (which also may be a monostable multivibrator). The trigger signal for trigger generator 48 is derived from the trailing edge of the pulse out of delay network 46. It follows then that there is isolation between the pilot pulse and the transmitted signal. The output signal of trigger generator 48 is the transmit initiate signal (on line 34).

The directional couplers 26a – 26c are here arranged such that each R.F. signal produced by pilot pulse generator 24 and coupled onto the channels 16a – 16c in response to a gating signal on line 32 is fed into receiver section 18 with equal amplitude and phase. Therefore, here, each one of the pilot pulses have equal amplitude and equal phase when supplied to each respective channel of receiver section 18.

Receiver station 18 is a conventional heterodyne receiver and includes R.F. amplifiers 50a – 50c, a local oscillator 52, mixers 54a – 54c, I.F. amplifiers 56a – 56c and range gating circuitry (here made up of AND gates 58a – 58c) all of conventional design and arrangement to convert R.F. signals applied to receiver section 18 (from either the pilot pulse generator or target return signals) into IF signals on lines 60a – 60c. Such I.F. signals pass through AND gates 58a – 58c each time a gating signal is applied to line 62. Such gating signal (on line 62) is supplied by timing and control section 30 during two exclusive time periods. The first one of such time periods occurs when the gating signal on line 32 is applied to R.F. switch 28. During such first time period the signal produced at the output of hold network 42 passes through OR gate 64. The second one of the time periods commences at a selected time after each transmitted pulse when the trigger generator output signal (i.e. the transmit initiate signal on line 34) passes through a delay circuit 66 to a conventional hold network 67. The gating signal at the output of the OR gate 64 is applied to AND gates 58a and 58c during the second time period. Such signal, therefore, may be viewed as a conventional range gating signal.

In summary, prior to each transmitted pulse, I.F. signals on lines 60a – 60c are produced in response to pilot pulses. Because each one of the pilot pulses has equal amplitude and equal phase, the I.F. signals produced in response to such pulses on lines 60a – 60c would have equal amplitude and equal phase if the R.F. and I.F. circuitry in the corresponding channels of receiver section 18 have the same gain and phase characteristics. In any practical receiver station, however, each one of such channels will not have the same gain and phase characteristics and therefore the I.F. signals on lines 60a – 60c will have different amplitude and different phase. At a time after a pulse is transmitted by transmitter 20 (such time corresponding to the range of a target), I.F. signals associated with target return signals from such target appear on lines 60a – 60c. As is known, relative amplitude and phase of these target return signals between the various sum and difference channels 16a – 16c provide a measure of the angular deviation of the target from the boresight line of the antenna, sometimes referred to as the angle error of the target. For an accurate measure of angle error, the gain difference and phase difference between channels as previously discussed must be accounted for.

Processor 68 resolves each one of the I.F. signals on lines 60a – 60c into two orthogonal components by means of local oscillator 70, quadrature generator 72 and mixers 74a – 74c, 74'a – 74'c. The frequency of local oscillator 72 is such that the signals on lines 76a – 76c, 74'a – 74'c are translated to a suitable video frequency so that they may be digitized by A/D converters 78a – 78c, 78'a – 78'c. Such A/D converters are synchronized, by signals on lines labelled t, by synchronizer 38 of timing and control section 30 and here operate at the Nyquist rate of the video signals.

The digitized signals at the output of A/D converters 78a, 78'a, 78b, 78'b, 78c, 78'c, are quadrature components of signals in response to R.F. signals, i.e. the pilot pulses from pilot pulse generator 24. Such digitized signals may be represented, respectively by the following equations:

(1) $S_{T_P} = S_T \cos \theta$
(2) $S_{T_Q} = S_T \sin \theta$
(3) $D_{TEP} = D_{TE} \cos (\theta + \phi_A)$
(4) $D_{TEQ} = D_{TE} \sin (\theta + \phi_A)$
(5) $D_{TAP} = D_{TA} \cos (\theta + \phi_E)$
(6) $D_{TAQ} = D_{TA} \sin (\theta + \phi_E)$, respectively, where:

$S_T$ = the amplitude of the signals produced on line 60a in response to such pilot pulses, $D_{TE}$ = the amplitude of the signals produced on line 60b in response to such pilot pulses, $D_{TA}$ = the amplitude of the signals produced on line 60c in response to such pilot pulses, $\theta$ = the phase angle of the signals on line 60a relative to an arbitrary reference, $\phi_E$ = the phase angle between the signals on line 60b and the signals on line 60a; and, $\phi_A$ = the phase angle between the signals on line 60c and the signals on line 60a.

The digitized signals at the output of A/D converters on lines 78a, 78'a, 70b, 70'b, 78c, 78'c are quadrature components of signals produced in response to target return signals and may be represented as (7) $\Sigma_P = \Sigma \cos \alpha$
(8) $\Sigma_Q = \Sigma \sin \alpha$
(9) $\Delta_{EP} = \Delta_E \cos (\alpha + \beta_A)$
(10) $\Delta_{EQ} = \Delta_E \sin (\alpha + \beta_A)$
(11) $\Delta_{AP} = \Delta_A \cos (\alpha + \beta_E)$
(12) $\Delta_{AQ} = \Delta_A \sin (\alpha + \beta_E)$, respectively where:

$\Sigma$ = the amplitude of the signals produced on line 60a from such target returns;

$\Delta_E$ = the amplitude of the signals produced on line 60b from such target return;

$\Delta_A$ = the amplitude of the signals produced on line 60c from such target returns;

$\alpha$ = the phase angle of the signals on line 60a relative to an arbitrary reference;

$\beta_E$ = the phase angle between the signals on line 60a and the signal on line 60b; and, $\beta_A$ = the phase angle between the signals on line 60a and the signal on line 60c.

Figure 2:
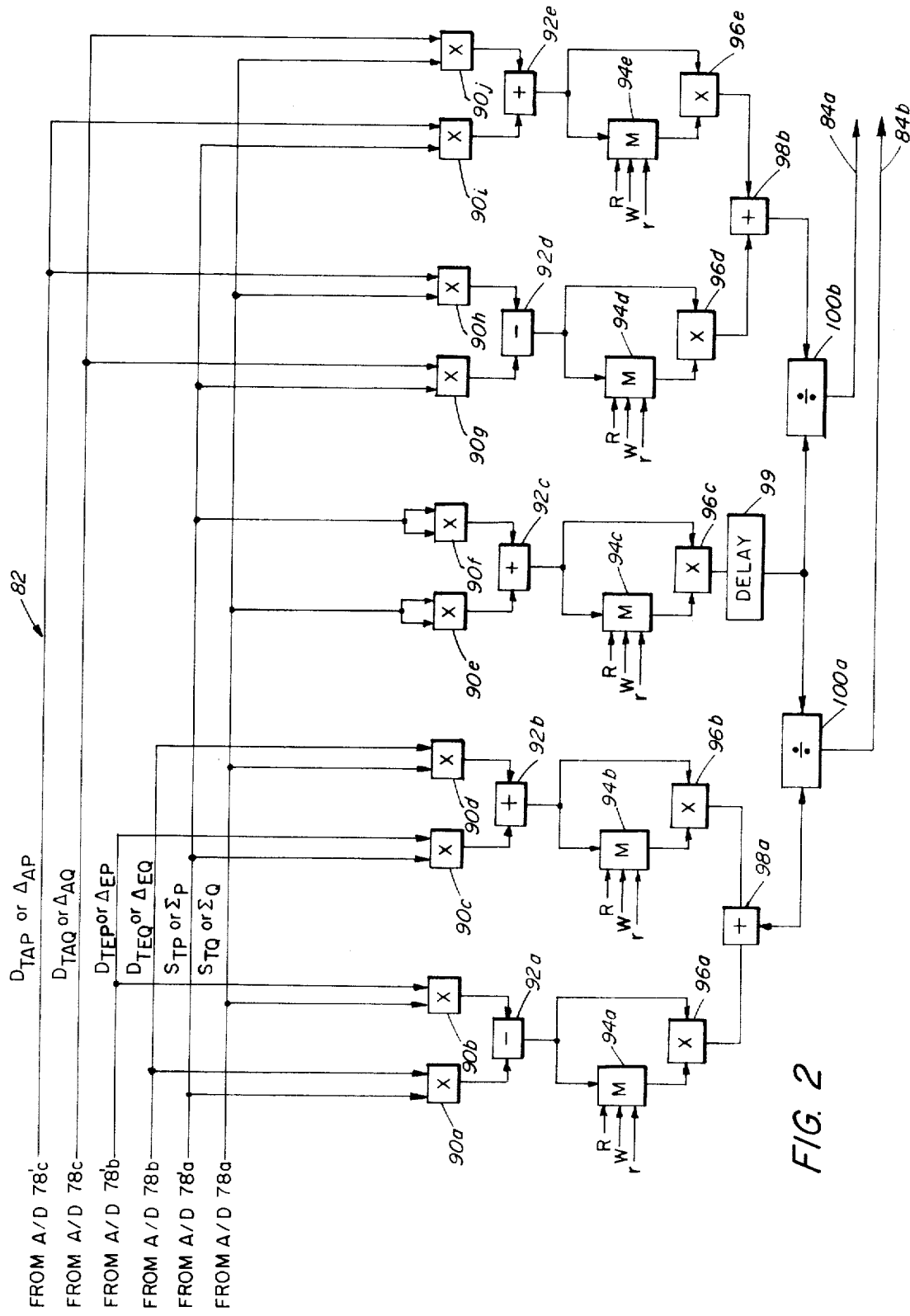
FIG. 2 is a block diagram of the digital angle error computer used in the monopulse radar system of FIG. 1.

The signals at the outputs of A/D converters 78a – 78c, 78'a – 78'c are applied to digital angle error computer 82. The details of such computer 82 are shown in FIG. 2 and will be discussed later; suffice it to say here that the output therefrom includes two digital signals which are applied to lines 84a – 84b, respectively. The signal on line 84a is indicative of azimuthal angle error of the target and the signal on line 84b is indicative of elevation angle error of the target. Such signals are gated through AND gate 86a – 86b (after a delay 87 equal to the length of the range gate) to utilization device 88 by means of the range gating signal (on line 62). Utilization device 88 is here a conventional display and includes a servo drive mechanism (not shown) for the antenna elements 12a – 12d.

As is known, the azimuth angle error of a target relative to the boresight axis of the radar antenna may be calculated from:

(13) $\epsilon_{az} = (\Delta_A/\Sigma_I) \cos \Psi A$ $\Psi A$ = the relative phase shift between the signals produced on line 16c and the signals on line 16a from target return signals;

$\Delta_A$ = the amplitude of the signals produced on line 16c from target return signals; and $\Sigma_I$ = the amplitude of the signals produced on line 16a from target return signals; and

(14) $\epsilon_{el} = (\Delta_E/\Sigma_I) \cos \Psi E$ where:

$\Delta_E$ = the amplitude of the signals produced on line 16b from target return signals;

$\Delta_E$ = the amplitude of the signals produced on line 16c from target return signals; and $\Psi E$ = the relative phase shift between the signals on line 16a and the signals on line 16b from target return signals.

Similarly, the corresponding azimuth angle error and elevation angle error derived from the pilot pulses may be expressed as:

(15) $\epsilon_{az}|P.P. = (D_{TA}/S_T) \cos \phi A$;

(16) $\epsilon_{el}|P.P. = (D_{TE}/S_T) \cos \phi E$.

A little thought will make it apparent, therefore, that the $\epsilon_{az}$ and $\epsilon_{el}$ derived from target return signals must be adjusted, to compensate for phase and amplitude differences in the two channels relative to the sum channel, as follows:

(17) $\epsilon_{az}|$corrected $= (\Delta_A/\Sigma)(S_T/D_{TA}) \cos (\beta_A - \phi_A)$;

(18) $\epsilon_{el}|$corrected $= (\Delta_E/\Sigma)(S_T/D_{TE}) \cos (\beta_E - \phi_E)$.

(19) $\epsilon_{az}|$corrected $=$
$([D_{TA}S_T \sin \phi_A][\Delta_A\Sigma \sin \beta_A]+[D_{TA}S_T \cos \phi_A][\Delta_A\Sigma \cos \beta_A])/D_{TA}^2 \Sigma^2$ where:

(20) $D_{TA}S_T \sin \phi_A = [S_T \cos \theta][D_{TA} \sin (\theta+\phi_A)] - [S_T \sin \theta][D_{TA} \cos (\theta+\phi_A)] = (S_{TP})(D_{TAQ})-(S_{TQ})(D_{TAP})$

(21) $\Delta_A\Sigma \sin \beta_A = [\Sigma \cos \alpha][D_A \sin (\alpha+\beta_A)] - [\Sigma \sin \alpha][D_A \cos (\alpha+\beta_A)] = (\Sigma_P)(\Delta AQ) - (\Sigma_{Qx}\Delta_{AP})$

(22) $D_{TA}ST \cos \phi_A = [S_T \cos \theta][D_{TA} \cos (\theta+\phi_A)] + [S_T \sin \theta[]D_{TA} \sin (\theta+\phi_A)] = (S_{TP})(D_{TAP})+(S_{TQ})(-D_{TAQ})$

(23) $\Delta_A\Sigma \cos \beta_A = [\Sigma \cos \alpha][\Delta_A \cos (\alpha+\beta_A)]+[\Sigma \sin \alpha][\Delta_A \sin (\alpha+\beta_A)]$
$= (\Sigma_P)(\Delta_{AP}) = (\Sigma_Q)(\Delta_{AQ})$ Equations analogous to equations 19 – 23 may now be developed for $\epsilon_{el}|$corrected.

Referring now to FIG. 2, the digital angle error computer 82 is shown in detail, such computer being mechanized to calculate $\epsilon_{az}|$corrected and $\epsilon_{el}|$corrected according to equations 17 and 18. That is, the digital angle error computer 82 digitally corrects the quadrature components associated with the target return signals in accordance with the quadrature components associated with the pilot pulses.

Digital angle error computer 82 includes five digital multipliers 90a – 90j, all synchronized in a conventional manner by synchronizer 38 (FIG. 1) (via connections not shown). The digital multipliers are connected to, selectively, A/D converters 78a–78c, 78a'–78c' as indicated. Also included are digital adders/subtractors 92a – 92e arranged as shown. The latter are connected respectively to conventional digital memory units 94a – 94e. Such memory units 94a – 94e are reset by signal r and then placed in a write condition by signal w. Signals r and w are produced by timing and control unit 30 (FIG. 1). Signal r is produced prior to signal w. Signal w is produced when the pilot pulses are fed into receiver section 18 (FIG. 1). Therefore, in operation, after memory units 94a – 94e are reset the following signals are written therein, respectively:

(24) $(S_{TP})(D_{TEQ})-(ST_Q)(D_{TEP})$;

(25) $(S_{TP})(D_{TEP})+(ST_Q)(D_{TEQ})$;

(26) $(S_{TQ})^2+(S_{TP})^2 = S_T^2$;

(27) $(S_{TP})(D_{TAQ})-(S_{TQ})(D_{TAP})$;

(28) $(S_{TP})(D_{TAP})+(S_{TQ})(D_{TAQ})$.

When the range gating signal from hold 67 (FIG. 1) is applied to AND gates 58a – 58c (FIG. 1) the memory units 94a – 94e are placed in a read condition by means of read signal R. Therefore, at the time of read signal R the signals at the output of digital adders/subtractors 92a – 92e are, respectively:

(29) $(\Sigma_P)(\Delta_{EQ})-(\Sigma_Q)(\Delta_{EP})$;

(30) $(\Sigma_P)(\Delta_{EP})+(\Sigma_Q)(\Delta_{EQ})$;

(31) $(\Sigma_Q)^2+(\Sigma_P^2) + \Sigma^2$;

(32) $(\Sigma_P)(\Delta_{AQ})-(\Sigma_Q)(\Delta_{AP})$;

(33) $(\Sigma_P)(\Delta_{AP})+(\Sigma_Q)(\Delta_{AQ})$.

The signals read from memory units 94a – 94e and the signals at the output of digital adders/subtractors 92a – 94e are multiplied in digital multipliers 96a – 96e, respectively. The signals at the output of digital multipliers 96a and 96b are added in digital adder 98a. The signal at the output of digital multiplier 96c passes through a delay network 99 (such delay network compensating for the inherent delay in digital adder 98a) to a digital divider 100a. A little thought will make it apparent that the output of digital divider 100a appears on line 84b and represents $\epsilon_{el}|$corrected. Likewise the signals at the output of digital multipliers 96d and 96e are added in digital adder 98b. The signal at the output of digital adder 98b is divided by digital divider 100b. The output of digital divider 100b appears on line 84a and represents $\epsilon_{az}|$corrected.

While we have described a preferred embodiment of the invention, it will now become readily apparent to those having ordinary skill in the art that other systems may be adapted to utilize this invention in order to obtain the same advantages. For example, the pilot pulses may be introduced into the receiver section after a number of R.F. pulses have been transmitted. Further, the pilot pulse generator may be replaced by coupling the output from the R.F. oscillator which would be used in the transmitter. It is therefore to be understood that the invention be limited only by the spirit and scope of the appended claims.

What is claimed is:

1. In a monopulse radar receiver, angle error digital computation apparatus for correcting received target return signals in accordance with correction signals derived within the receiver in response to pilot pulses, such apparatus comprising:

a. means for generating a first pair of quadrature components of video signals developed in a sum channel and at least one difference channel in the receiver in response to the target return signals, and for generating a second pair of quadrature components of the video signals developed in the sum and the at least one of the difference channels in response to the pilot pulses;

b. means for generating digital signals representative of the first pair of quadrature components, and for generating digital signals representative of the second pair of quadrature components; and c. means for digitally processing the digital signals representative of the first pair of quadrature components in accordance with the digital signals representative of the second pair of quadrature components for correction of the received target return signals.

2. The apparatus recited in claim 1 wherein the digital processing means comprises:

a. means for generating digital correction signals from the digital signals representative of the second pair of quadrature components and for generating digital correctable signals from the digital signals representative of the first pair of quadrature components; and b. means for digitally combining the digital correction signals and the digital correctable signals.

3. The apparatus recited in claim 2 wherein the digital combining means includes, additionally, means for storing the digital correction signals and means for combining the digital correctable signals with the stored digital correction signals.

* * * * *

UNITED STATES PATENT OFFICE
CERTIFICATE OF CORRECTION

Patent No. 3,794,998              Dated February 26, 1974

Inventor(s) Earl C. Pearson, Jr. et al

It is certified that error appears in the above-identified patent and that said Letters Patent are hereby corrected as shown below:

Column 3, line 9, change "section" to --station--

Column 3, line 41, change "section" to --station--

Column 4, equation 2 is not on same line.

Column 4, line 8, delete "= $S_T \sin \Theta$

Column 4, line 9, add -- = $S_T \sin \Theta$ --

Signed and Sealed this twenty-third Day of September 1975

[SEAL]

Attest:

RUTH C. MASON
Attesting Officer

C. MARSHALL DANN
Commissioner of Patents and Trademarks